Aug. 25, 1953

J. MUNZ ET AL 2,650,149

AUTOMATIC VENDING MACHINE

Filed Sept. 16, 1949

Inventors
JAROSLAV MUNZ
JAROSLAV TICHOPAD
By: Fetherstonhaugh & Co.
Att'ys

Aug. 25, 1953　　　　　J. MUNZ ET AL　　　　　2,650,149
AUTOMATIC VENDING MACHINE
Filed Sept. 16, 1949　　　　　　　　　　　　　　　6 Sheets-Sheet 4

Inventors
JAROSLAV MUNZ
JAROSLAV TICHOPAD
By: Fetherstonhaugh & Co.
Att'ys

Aug. 25, 1953

J. MUNZ ET AL
AUTOMATIC VENDING MACHINE 2,650,149

Filed Sept. 16, 1949

Inventors
JAROSLAV MUNZ
JAROSLAV TICHOPAD
By: Fetherstonhaugh & Co.
Att'ys

Patented Aug. 25, 1953

2,650,149

UNITED STATES PATENT OFFICE 2,650,149

AUTOMATIC VENDING MACHINE

Jaroslav Munz and Jaroslav Tichopad, Toronto, Ontario, Canada

Application September 16, 1949, Serial No. 116,018

3 Claims. (Cl. 312—66)

This invention relates to dispensing mechanism for vending apparatus.

This application forms a continuation-in-part of United States application Serial No. 2,778, filed January 16, 1948.

The objects of the invention will be appreciated from a study of the following specification taken in conjunction with the accompanying drawings which, it will be appreciated, illustrate mechanisms similar in many respects to the invention described in our application Serial No. 2,778, filed January 16, 1948.

Figure 1:
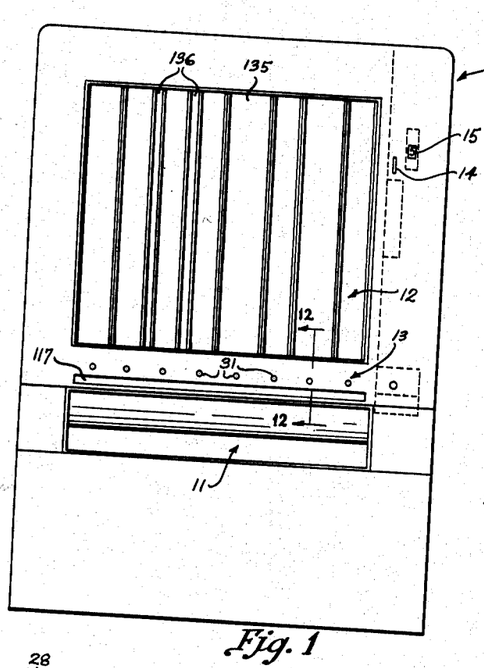
Figure 1 is a front elevation of the present vending machine disclosing the merchandise storing columns and the co-operatively mounted selecting rods therefor.
Figure 2:
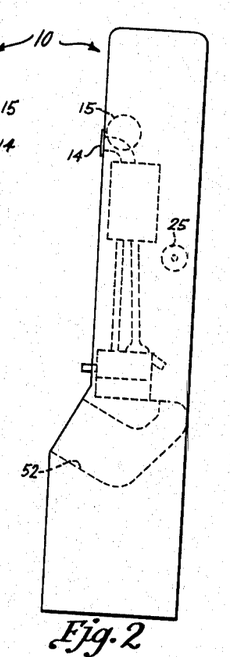
Figure 2 is an end elevation of the present machine generally indicating the disposition of the various co-operating components.

Referring to Figures 1 and 2 the apparatus 10 has a merchandise discharge opening 11 accessible to an operator from which discharged merchandise may be retrieved. Disposed above this opening is a series of merchandise columns 12 which may be of various dimensions but which in any case, have corresponding selecting rods 13 therefor. Suitable coins may be inserted in the slot 14 and the totalizer indicator 15 will show the total amount of coinage placed into the machine. The apparatus may be of the type described in application Serial No. 2,778 wherein the coin receiving mechanism is capable of accepting coins of various denominations in any order and wherein the selecting rod may be actuated after the insertion of the coins to cause an electrically driven mechanism to discharge the selected merchandise from the machine. Therefore, the particular coin receiving device in the form of a slotted armature mechanism 16 is shown generally in Figure 3 for the purpose of illustrating improvements relative to the ratchet release mechanism 17 described herein although it will be appreciated that details of the structure are described in our prior application. It will be appreciated that the present invention relating to merchandise discharge mechanism and associated components is not limited to the use of a slotted armature described and claimed in the prior application since any coin totalizing device may be employed, the invention herein concerning the electrical means for allowing return of the coin totalizing mechanism such as the slotted armature illustrated.

Figure 3:
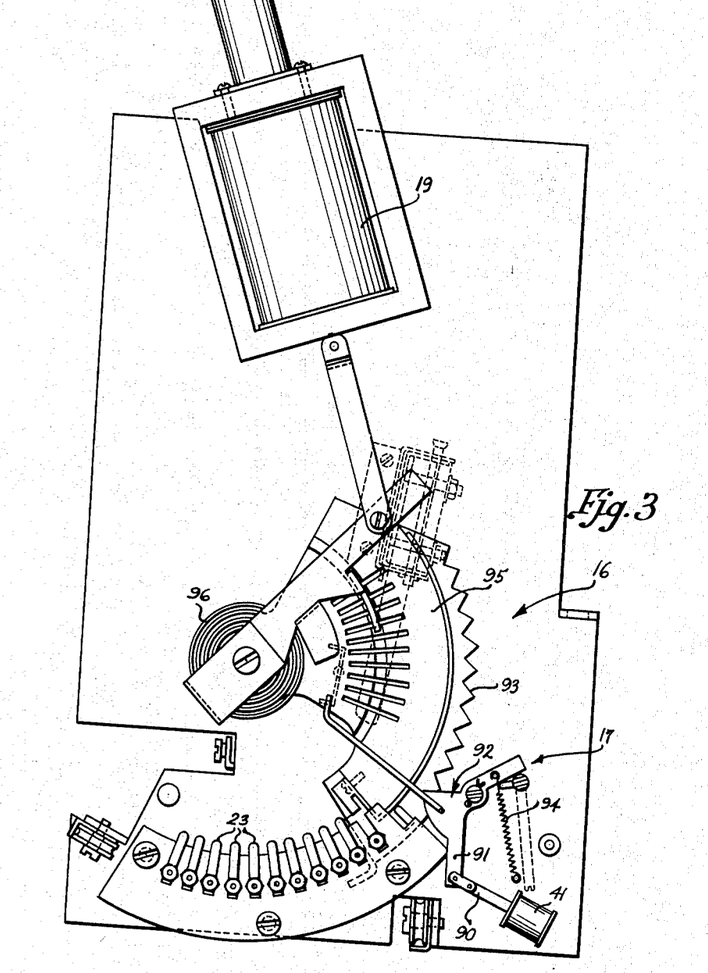
Figure 3 is a plan view of a coin receiving and registering member or slotted armature indicating solenoid actuated means therefor and a segmental electrical contact means mounted in co-operation therewith and controlling the electrical drive mechanism for ejecting articles of merchandise from the present machine. Particulars of the structure of the mechanisms shown in this view are fully described in application Serial No. 2,778 referred to above.
Figure 4:
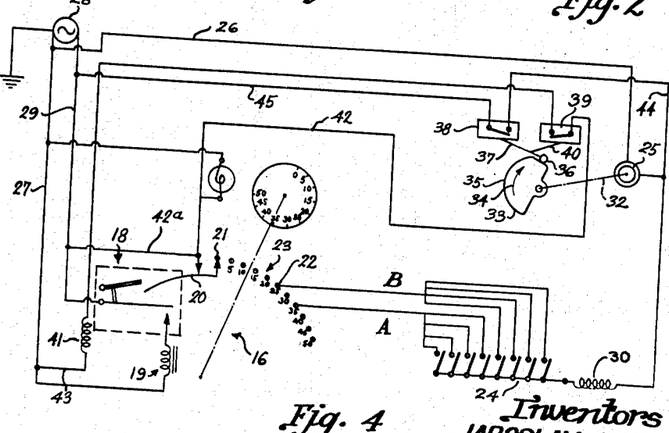
Figure 4 is an electrical schematic of the electrical circuit which is an improvement over that described in our prior application referred to and which according to the present invention, includes switch means which are cam controlled to govern the actuation of the merchandise discharge mechanism.
Figure 5:
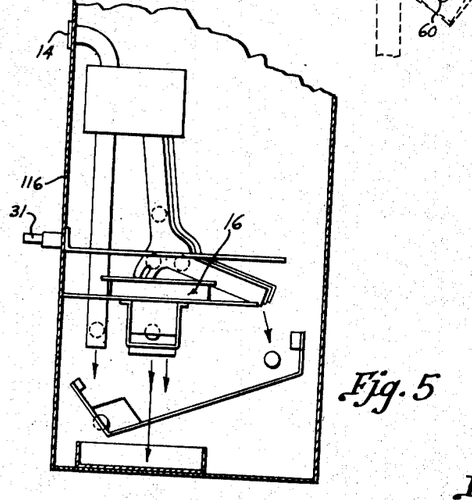
Figure 5 is a cut-away view of the machine generally indicating the various coin channels relevant to the handling of valid and non-valid coins described in my prior application referred to but illustrated herein for the purpose of continuity.

Referring to Figure 4, as in our application Serial No. 2,778, the coin actuated sensitive switch 18 is actuated by valid coins passing through the slotted armature device 16 to energize the solenoid 19 (Figure 3) thereof to cause clockwise rotation of the peripheral strip 20 until the coins entered cause the strip to move to a position such that its contact 21 engages a contact such as contact 22 corresponding to the purchase price of 25¢ to which group B of the radially disposed contacts 23 are connected. Therefore, any of the selecting rods of the associated columns of group B, having switches 24, will close the electrical circuit of the motor 25 as will be evident by noting that the motor connects by line 26 to the grounded side 27 of the electrical current supply 28 whereas the armature device and one of the switches 24 will have completed the other side of the circuit through to line 29 of the source 28. Also note that the locking rod solenoid 30 being electrically in series with switches 24 and motor 25 will have its circuit completed. The locking bar solenoid 30 is utilized in a manner yet to be described in the device of Figures 8 to 11 and serves the purpose of retaining a selecting rod 31 (see the latter figures) in the actuated position.

The motor 25 is in drive connection through a suitable gear reduction device as indicated by operative connecting line 32 with a cam device 33 which is driven in a clockwise direction shown by arrow 34. The cam is shown in the normal non-actuated position and supports on its semi-circular periphery 35 a roller 36 on the end of an arm 37 which governs actuation of a sensitive switch device 38. This switch device shall be termed the motor switch device and is of the normally closed type but is open for the position of the arm 37 shown. The motor 25 and cam 33 are operatively related through suitable linkage devices yet to be described to means for discharging merchandise from the machine. Therefore, as the motor circuit is completed the discharging operation will be initiated and progress to a full limit corresponding to the actual discharge of merchandise at which the semi-circular periphery 35 of the cam passes the roller 36 allowing the arm 37 to drop and thereby causing the motor switch 38 to close.

At this point of operation two factors come into play. The discharge mechanism must be returned to the normal position and the totalizer device or slotted armature means 16 must also be returned to the normal position. In respect to the slotted armature a totalizer reset switch 39 is employed which is of the normally closed type but is open for the position of the components illustrated in Figure 4 and has arm 40 engaging arm 37 for operative actuation thereby. Therefore, as the arm 37 drops in the manner described, the arm 40 will also drop and the switch 39 will close at the same time as closure of motor switch 38 is effected. As a consequence, totalizer switch 39 will complete the circuit of the reset solenoid 41, as associated with the slotted armature 16 in a manner yet to be described, by completing electrical connection through the lines 42 and 42a to the line 29 and the source and by way of line 43 which connects directly to this reset solenoid which extends from the grounded side 27 of the electrical source 28. Therefore, the slotted armature device will be released to return to its normal position in a manner yet to be described but the motor circuit will be retained by the motor switch 38 since line 44 of the motor will connect therethrough to line 45 which is in connection with line 29 of the source, the motor already being in direct connection with the line 26 to the grounded side.

The motor will, therefore, continue to drive the cam device 33 and the discharge mechanism to cause return of the latter to its normal position until the roller 36 is engaged by the semi-circular surface 35 of the cam thereby opening the switches 38 and 39.

Figure 14:
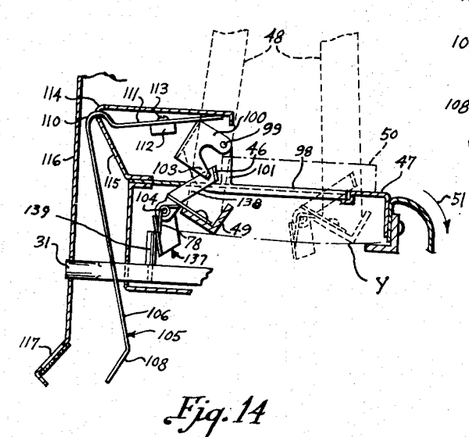
Figure 14 is a sectional view corresponding to a further operational disposition of the components of Figure 12 when merchandise is resting in the column to show how the indicating member is withdrawn.
Figure 15:
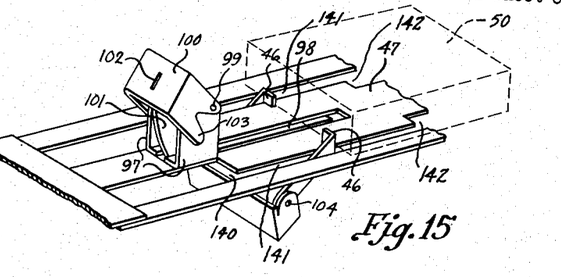
Figure 15 is a perspective view of a merchandise platform illustrating the position of the components when the merchandise column is carrying merchandise.

By reference to our prior application noted, it will be realized that in the mechanism disclosed in Figures 14 and 15, the actuation of a selecting rod 31 causes the push fingers 46 to be raised above the merchandise supporting platform 47 as illustrated in Figure 15 and that the discharging arm 48 is operatively connected to these push fingers by the transverse channel member 49 so that the push fingers are urged in advancing direction to cause the article of merchandise 50 to fall in the direction of arrow 51 (Figure 14) to be received in the trough 52 (Figure 2) from which it may be retrieved by the operator. The two extreme operative positions of the arm 48 are illustrated in Figure 14 and the manner of actuation of the same is disclosed by reference to Figures 6 and 7.

Figure 6:
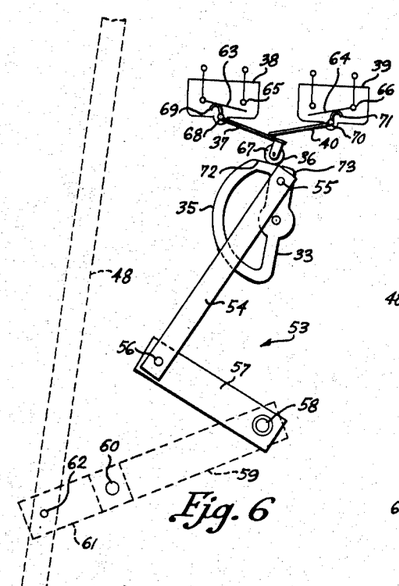
Figure 6 is an elevation of cam switch mechanism and the merchandise discharge arm and link components in the withdrawn position.
Figure 7:
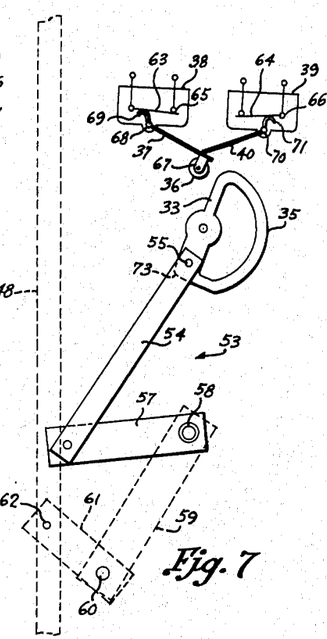
Figure 7 is a further operative view of the components of Figure 6 showing the disposition of same corresponding to the advanced position and the discharge of merchandise from the machine.
Figure 8:
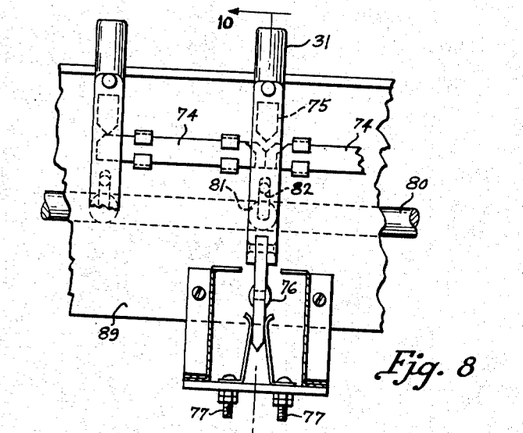
Figure 8 is a plan view of a selecting rod which includes the improvement of a locking rod according to the present invention to retain the selecting rod in the actuated position until merchandise is discharged from the machine.
Figures 9, 11:
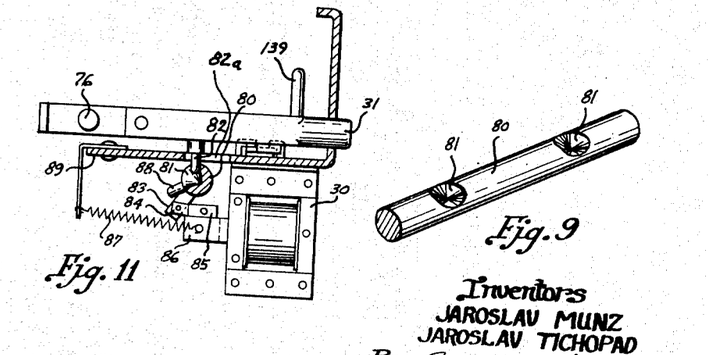
Figure 9 is a perspective view of a portion of the locking rod illustrated in Figure 8.
Figure 11 is a further operative view of Figure 10 illustrating the position of the components corresponding to the actuated position of the selecting rod.

Referring to the latter figures the arm 48 which is pivoted at its upper end (not shown) is connected by suitable linkage 53 to the cam 33. Although a single link arm connecting between the mid-point of the semi-circular region of the cam 33 to the arm 48 would give the same function, the structure actually employed by reason of dimensional considerations within a practical machine is illustrated. Thus, the link arm 54 extending from pivotal connection to the cam 33 as at 55 connects pivotally as at 56 to the link 57 which is swingable about the fixed stud shaft 58 which may be anchored to a suitable portion of the frame of the machine. Link 57 is rigidly connected to link 59 so that the angle between these links remains constant, the latter link pivotally connecting at its outer end as at 60 to the relatively shorter link 61 extending for connection as at 62 to the arm 48. As the cam 33 rotates clockwise from the normal position illustrated in Figure 7 the arm 48 is drawn to the position indicated in Figure 7 corresponding to the maximum swingable position of the arm for discharge of merchandise from the machine by the push fingers 46 (Figure 15).

The motor switch 38 and totalizer reset switch 39 are shown in their "at-rest" open positions in Figure 6, that is to say, the switch arms 63 and 64 are disposed away from the circuit closure for the switch terminals 65 and 66. The arm 37 of motor switch 38 carries at its outer end the roller 36 which is mounted thereon by a suitable bracket 67, the arm being pivoted as at 68 and carrying an engaging member 69 which controls the position of the switch arm 63. In a somewhat similar manner the arm 40 is pivoted as at 70 and carries the engaging member 71 thereon.

Preferably, the cam 33 has a substantially flat portion 72 in its semi-circular surface 35 to insure a more positive action of the switches. As the cam rotates through 180°, the arms 37 and 40 fall to the position indicated in Figure 7, the engaging members 69 and 71 thereof causing movement of the switch arms 63 and 64 for closure of the switches 38 and 39. As the cam 33 continues its rotation in clockwise manner the shoulder 73 thereof will cause a relatively sharp opening of the switches 38 and 39, the shoulder being so positioned that it may, if desired, cause the switches to open before the mechanisms controlled thereby finally come to rest to compensate for inertia effects in the mechanism. As an alternative, it would be obvious to provide a brake mechanism (not shown) which will act instantly when electrical current ceases to be supplied to the drive motor.

Figure 10:
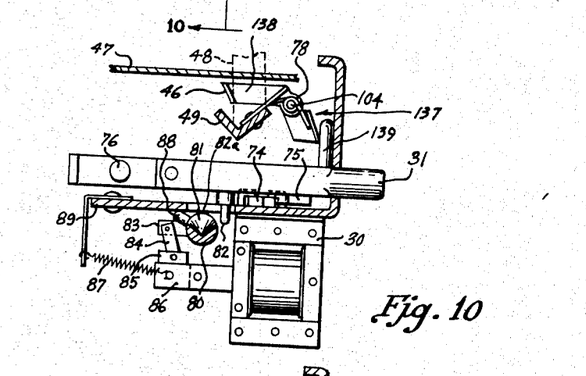
Figure 10 corresponds generally to sectional view 10—10 of Figure 8 but includes the illustration of a solenoid actuating means for the locking rod which it will be appreciated may be disposed at any convenient location transversely of the machine to operatively connect to the locking rod. The illustration shows the selecting rod in the normal position.

In accordance with this invention the locking rod solenoid 30 is employed to control the merchandise selecting rod mechanism illustrated in Figures 8 to 11 to retain a selecting rod 31 in the actuated position during delivery of merchandise. As will be apparent in Figure 8 a plurality of blocking bars 74 are arranged end to end transversely of the machine and associated with the selecting rods, being disposed therebetween such that the total clearance between their abutted ends is sufficient to allow actuation of one selecting rod only at a time by allowing a wedge lug 75 of a selecting rod to pass therebetween. The selecting rod may, therefore, pass inwardly until contacts 76 provide a closed circuit between terminals 77, the same constituting the switch means 24 referred to in the previous description with reference to Figure 4. As shown in Figure 10 each selecting rod is held under spring pressure normally in the outwardly disposed position under action of the spring 78 retaining the push fingers 46 of the merchandise delivery mechanism in the normal retracted position. As a result, therefore, when the operator actuates the selecting rod 31, it would be necessary, as will be noted by referring to Figure 4, for the selecting rod to be held in the depressed position until the motor switch 38 was closed by semi-revolution of cam 33. To relieve the operator of this duty a locking rod 80 is disposed transversely of the machine beneath all of the selecting rods and has a plurality of locking sockets 81 arranged to accommodate a locking lug 82 extending through slot 82a downwardly from each selecting rod. The locking rod 80 is rotatably mounted in suitable bearings (not shown) and has an arm 83 extending therefrom to pivotally mount a link 84 which extends to a bracket 85 on the end of the armature 86 of the solenoid 30. A suitable spring 87 holds the armature 86 of the solenoid normally in the outward position and the locking rod 80 in the position illustrated in Figure 10 such that its stop member 88 engages the undersurface of the mounting plate 89. As the selecting rod 31 is urged forwardly the locking lug 82 thereof passes into an adjacent socket 81 of the locking bar and if the electrical circuit to the switch means 24 is completed by the slotted armature device by the entry of a purchasing sum, the solenoid will be energized moving the locking bar counter-clockwise to the position indicated in Figure 11 to retain the selecting rod in the actuated position until the solenoid is de-energized. The solenoid will be de-energized when the slotted armature device is allowed to return to its normal position which, as previously described, occurs when the cam 33 has passed through substantially 180° of its rotative movement.

The totalizer reset switch 39 will cause energization of the totalizer reset solenoid 41 (Figure 3) after the merchandise has been delivered to the merchandise discharge compartment 52. Referring to Figure 3, the armature 90 of solenoid 41 pivotally connects to the arm 91 of the pawl 92. The pawl is held normally into engagement with the ratchet teeth 93 of the totalizer device or slotted armature illustrated by tension of spring 94. It will, therefore, be readily apparent that when the solenoid 41 is energized to cause counter-clockwise movement of pawl 92 to provide disengagement of the same from the ratchet teeth 93, that the slotted armature component 95 will be free to rotate counter-clockwise under action of its return spring 96 to the normal position, being the position indicated in Figure 3. In all other respects the operation and construction of the components illustrated in this figure are similar to that described in my previous application.

Figure 12:
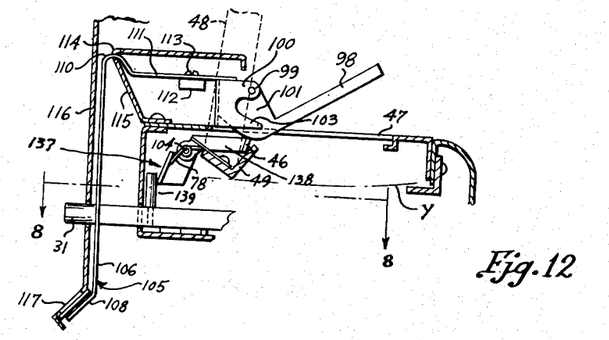
Figure 12 is a sectional view on line 12—12 of Figure 1 illustrating particularly the mounting of a member employed to indicate when a particular merchandise column is empty and illustrating the position of the components for an empty column.
Figure 13:
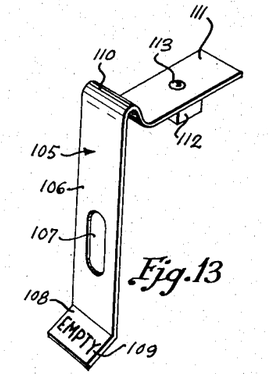
Figure 13 is a perspective view of the indicating member employed.

In Figures 12 to 14 indicating means are illustrated whereby the operator may be informed when a particular merchandise column is exhausted of merchandise. Referring also to Figure 15, it will be observed that brackets 97 extend upwardly from the merchandise support platform 47 to mount the control arm 98 pivotally on the shaft 99. A generally U-shaped member 100 is also swingable on the shaft 99 and is connected to the supporting web 101 of the arm 98 by its slot 102 engaging a suitable lug (not shown) on the web. It will, therefore, be apparent that the member 100 and the arm 98 are rigidly inter-connected but are swingable about the shaft 99. As will be evident upon referring to Figure 14, when the arm 98 is depressed by merchandise 50 resting thereon, the arm portion 103 of the member 100 is disposed slightly clockwise to allow free passage of the push fingers 46 about their pivotal point of rotation 104 so that the push fingers may pass forward. If, however, the particular merchandise column is empty, the arm 98 will be free to rotate to the position indicated in Figure 12.

We, therefore, provide an indicator member 105 (shown in Figure 13) having a body portion 106 slotted as at 107 for passage of a selecting rod and carrying a flange 108 at the free end thereof carrying suitable lettering 109. A fulcrum portion 110 is formed on the other end of the body and from which a counter-weight arm 111 extends. If desired, a counter-weight member 112 may be mounted on the arm 111 by a suitable screw 113. Thus, in Figure 12, the free end of the arm 111 rests on the upper edge of the member 100 to cause the arm 98 to be raised upwardly. The weight of the arm 111, however, is only sufficient to cause movement of the arm 98 to the upward position if there is no merchandise resting on the arm. It will be apparent that the fulcrum portion 110 of the indicator member 105 passes through a slot 114 in a suitable sheet metal support 115 extending upwardly from the merchandise support platform 47. A sheet metal facing 116, forming the front exterior surface of the complete machine, has a continuous transverse slot 117 therein extending below the selecting rods as indicated in Figure 1. The flange portion 108 of each of the indicator members will be disposed in the position indicated in Figure 12 such that the operator may see the reading matter 109 thereon when the merchandise columns are empty. However, when an article of merchandise 50 is resting on a control arm 98, the indicator member 105 will be rotated to the position indicated in Figure 14 so that the flange 108 thereof is disposed out of view by the operator.

Figure 16:
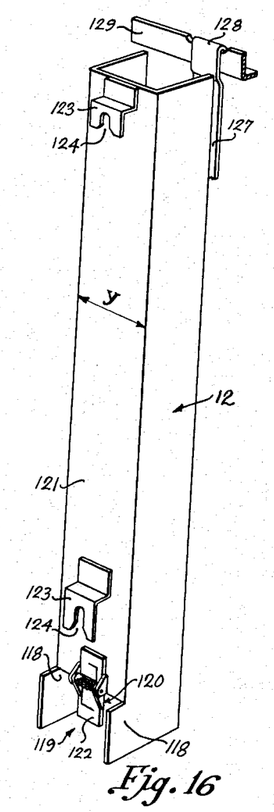
Figure 16 is a perspective view of a merchandise column according to the invention which is of the replaceable or removable type.
Figure 17:
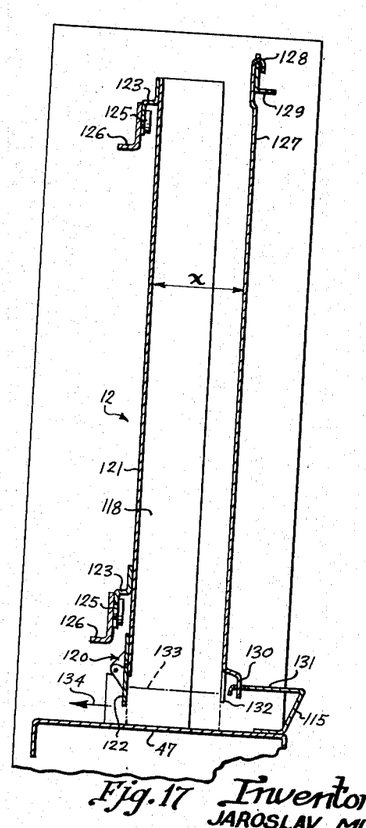
Figure 17 is a sectional side elevation of a merchandise column of the invention illustrating the manner of mounting the same in the machine.

In accordance with the present invention the vending apparatus is capable of adjustment to handle various sizes of merchandise within a limited range. Thus, the merchandise columns 12 of Figure 1 may be of various widths in accordance with the width of the merchandise to be vended. In Figures 16 and 17 a merchandise column 12 is shown as being of a generally U-shaped sectional form having at the lower end thereof side wings 118 extending rearwardly to define a discharge opening 119. A spring restrained gate 120 is mounted on the rear wall 121 of the column and associated with the opening 119 such that the gate member 122 thereof normally extends across the opening. Mounting brackets 123 extend from the wall 121 and have slots 124 designed to pass over the mounting lugs 125 supported on a suitable frame piece 126 running transversely of the machine in the rearward portion. The open side of the merchandise column opposed to the rear wall 121 is partially covered by a merchandise retaining strap 127 which has a hooked portion 128 designed to pass over the support piece 129 which may form a portion of the frame of the machine. The lower end of the strap 127 carries a finger 130 which extends through a suitable slot in the upper wall 131 of the sheet metal support 115 (see also Figure 12). Note that the free end 132 of the strap 127 extends downwardly a sufficient distance to engage a side wall of a single article of merchandise 133 resting upon the support platform 47. As merchandise is discharged from the column gate 122 will be deflected to allow the article 133 to proceed in the direction of arrow 134.

The merchandise columns may be designed to handle various lengths of merchandise relevant to the dimension X by proportioning the rearward extent of the mounting brackets 123. There are, however, obvious limits to the length dimension of merchandise which can be handled which will be a maximum dimension for any one machine. However, with a particular machine, various merchandise columns may be provided which will be suitable to vend merchandise of lengths less than a certain maximum figure.

Also the height of the merchandise discharge opening 119 will determine the maximum thickness of an article which may be discharged. It will also be apparent that the columns may be of varied width as represented by the dimension Y since it is only necessary that they be located axially in alignment with their respective selecting rods. In Figure 1 a merchandise discharge column 135 is shown of comparatively greater width than the other merchandise columns. In the practical sense a single merchandise column may be of a width dimension less than that which would cause interference with push fingers 46 of adjacent selecting rod mechanism. This would mean, of course, that the width dimension of the merchandise handled by the adjacent columns could not be greater than the dimension between the associated push fingers in the discharge mechanism thereof. Obviously merchandise columns of different dimensions with respect to width and depth may be provided according to the invention. It is preferred that a particular merchandise column be made for each type of article so that the merchandise columns may be packed at the merchandise distributing centre and then distributed to various machines so that it will not be necessary to load the machines by individual handling of the articles to be vended. This is a particular advantage in the vending of articles such as cigarettes, and chocolate bars and the like. If desired, where adjacent merchandise columns are comparatively narrow a suitable spacer such as spacers 136 may be provided for sake of better appearance.

An important feature of the vending machine of the invention resides in the merchandise discharging mechanism involving the merchandise platform 47 and push fingers 46 briefly described previously. Thus, referring to Figures 12, 14 and 15, it has been noted that the swingable arms of the merchandise discharging arms 48 carry the transverse channel member or carriage 49 pivotally mounting brackets 137 having bracket arms 138 carrying the push fingers 46. The channel member has a reciprocating motion for the discharge of articles, the particular motion illustrated in Figure 14 being indicated by the path Y. It will be appreciated, however, that this path need not be arcuate but may be a simple backward and forward motion depending upon the specific actuating mechanism employed which, in the present instance, is in the form of the discharging arms 48 driven by the linkages previously described in Figures 6 and 7.

As a selecting rod 31 is actuated by the operator, the lug 139 will engage the pivoted bracket 137 mounted on the carriage or transverse channel member 49. The bracket arms 138 will ride up through the "initial position" gaps 140 (see Figure 15) of the platform or merchandise support 47. This function may only be accomplished, however, if merchandise indicated in dotted lines by numeral 50 in Figure 15 is resting upon the merchandise platform and upon the control arm 98 which is swingably mounted in bracket 97 as previously described. The guard arms or arm portions 103 of the control member will be disposed in the path of the bracket arms 138 and push fingers 46 as illustrated in Figure 12, if no merchandise is resting on the control arm 98. However, when merchandise is sitting upon the control arm, the guard arms 103 will be swung away from the path of movement of the push fingers 46 in the manner illustrated in Figure 14 so that the latter may rise through the gaps 140 in the merchandise platform when the selecting rod 31 is actuated.

Assuming the electrical circuit to be completed in the manner previously described, the arms 48 will be actuated by the linkage previously discussed and will move along path Y to urge the merchandise 50 in the direction of arrow 51 (Figure 14). In this action, the push fingers 46 ride the upper surface of the platform 47 since the bracket arms 138 will be accommodated by the longitudinally extending slots 141. As the push fingers reach the end limit of their travel and the merchandise falls along path 51 to the merchandise retrieving trough 52 (see Figure 2), they will fall through the "end limit" gaps 142 under action of the spring 78. Therefore, on the return stroke of the carriage 49, the bracket arms 138 will be disposed below the merchandise platform and will not interfere with merchandise falling upon the control arm 98 to take the place of merchandise just discharged. The merchandise discharging mechanism will return on the path Y to the initial ready position or normal position illustrated in Figure 12.

Many alternatives of specific construction will be apparent to skilled persons in view of the above detailed disclosure. It is intended, therefore, that the present description should not be construed in any limiting sense other than that indicated by the scope of the following claims.

What we claim as our invention is:

1. Merchandise discharging mechanism for a vending machine having a merchandise storing column and comprising in combination a merchandise support platform arranged beneath said column, a reciprocable carriage disposed beneath said platform and moveable from an initial to a final position, at least one bracket arm pivotally mounted on said carriage beneath said platform and including a push finger on the free end of said arm, a slot in said merchandise platform extending in the direction of movement of said carriage and designed to accommodate said arm but not the push finger thereof and having a gap at the initial and the terminal ends thereof to accommodate said push finger, means actuable by an operator for causing said arm and push finger to rise through the initial and end limit gap in the platform at the initial position of said carriage, means for moving said carriage to cause said push finger to engage and move an article of merchandise resting on said platform and spring means for causing the push finger to fall through the end limit gap of the platform as the carriage is moved to its final position and to cause said bracket arm and said push finger to assume a position underlying said platform, and means for returning said carriage and said fingers by a path underlying said platform to the initial position.

2. Merchandise discharging apparatus as claimed in claim 1, and a control arm pivotally mounted on said platform, the latter having a slot to accommodate said arm swingably to lie therewithin and to align its upper surface with the upper surface of said platform when merchandise is resting thereon, a guard arm extending from operative connection to said control arm and disposed out of the path of the bracket arm and push finger rising through said initial gap when the control arm is depressed to the aligned position with the upper surface of the platform, said guard arms being swingable to a position overlying and in the path of said push fingers in accordance with swinging motion of said control arm to a position above said platform when no merchandise is resting on the latter.

3. Merchandise discharging mechanism for a vending machine having a merchandise storing column and comprising in combination a merchandise support platform arranged beneath said column, a reciprocable carriage disposed beneath said platform, bracket arms pivotally mounted on said carriage beneath said platform and including push fingers on the free ends of the said arms, slots in said merchandise platform extending in the direction of movement of said carriage and designed to accommodate said arms but not said push fingers and having "initial" and "end limit" gaps at the terminal ends thereof to accommodate said push fingers, means actuable by an operator for causing said arms and push fingers to rise through the initial gaps of said platform at an initial position of said carriage, means for moving said carriage and said arms to cause the push fingers to engage an article of merchandise resting on said platform and spring means for causing the push fingers to fall through the end gaps of said platform as the carriage reaches the end limits of its travel whereby the bracket arms and said push fingers return underneath said platform to the initial position.

JAROSLAV MUNZ.
JAROSLAV TICHOPAD.

References Cited in the file of this patent

UNITED STATES PATENTS

| Number | Name | Date |
|---|---|---|
| 593,131 | Sipro | Nov. 2, 1897 |
| 593,132 | Sipro | Nov. 2, 1897 |
| 910,906 | Cook | Jan. 26, 1909 |
| 1,356,345 | Lany | Oct. 19, 1920 |
| 1,584,406 | Street | May 11, 1926 |
| 1,635,451 | Zsoldos | July 12, 1927 |
| 1,925,677 | Richardson | Sept. 5, 1933 |
| 2,100,752 | Scheurer | Nov. 30, 1937 |
| 2,323,981 | Du Grenier | July 13, 1943 |
| 2,333,176 | Hoban | Nov. 2, 1943 |
| 2,354,896 | Weiler | Aug. 1, 1944 |
| 2,377,413 | Fry | June 5, 1945 |
| 2,413,304 | Fry | Dec. 31, 1946 |